US010120091B2

(12) United States Patent
Ogilvie

(10) Patent No.: US 10,120,091 B2
(45) Date of Patent: Nov. 6, 2018

(54) MARINE SURVEYING

(71) Applicant: Fugro N.V., Leidschendam (NL)

(72) Inventor: Angus James Stephen Ogilvie, Aberdeen (GB)

(73) Assignee: Fugro N.V. (NL)

( * ) Notice: Subject to any disclaimer, the term of this patent is extended or adjusted under 35 U.S.C. 154(b) by 8 days.

(21) Appl. No.: 14/966,152

(22) Filed: Dec. 11, 2015

(65) Prior Publication Data

US 2016/0170062 A1    Jun. 16, 2016

(30) Foreign Application Priority Data

Dec. 12, 2014    (NL) ...................................... 2013969

(51) Int. Cl.
*G01V 1/38*    (2006.01)
*G01V 1/16*    (2006.01)

(52) U.S. Cl.
CPC ............ *G01V 1/3808* (2013.01); *G01V 1/162* (2013.01)

(58) Field of Classification Search
CPC .............................. G01V 1/162; G01V 1/3808
USPC .......................................................... 367/15
See application file for complete search history.

(56) References Cited

U.S. PATENT DOCUMENTS

| 1,483,547 A | 2/1924 | Hayes | |
| 4,422,166 A * | 12/1983 | Klein | G01S 15/025 340/850 |
| 5,970,023 A | 10/1999 | Chambers et al. | |
| 2008/0167768 A1 * | 7/2008 | Rubenstein | B63B 39/04 701/21 |
| 2010/0014382 A1 | 1/2010 | Yang et al. | |
| 2010/0302907 A1 | 12/2010 | Brumley | |

OTHER PUBLICATIONS

Henkart, Chirp Sub-Bottom Profiler Processing—A Review, Oct. 2006, downloaded Apr. 14, 2017 from https://www.ldeo.columbia.edu/res/pi/MB-System/sonarfunction/20061001HenkartChirpSubbottom.pdf, 3 pp.*
"Seabed", definition according to Merriam-Webster, downloaded Oct. 10, 2017 from https://www.merriam-webster.com/dictionary/seabed, 10 pages.*
"Survey", definition according to the Oxford English Dictionary, downloaded Oct. 10, 2017 from https://en.oxforddictionaries.com/definition/survey, 8 pages.*
Search Report dated Aug. 25, 2015; The Netherlands Application No. 2013969.

(Continued)

*Primary Examiner* — Daniel L Murphy
(74) *Attorney, Agent, or Firm* — Polsinelli PC

(57) ABSTRACT

Disclosed is a system for surveying the structure beneath the seabed using a sub-bottom profiler. The system can include a survey vessel and a sub-bottom profiler mounted to travel with the survey vessel. The sub-bottom profiler can comprise a transmitter for transmitting pulses at a predetermined period between pulses towards the seabed, and a first receiver and a second receiver for receiving reflections from the seabed of each transmitted pulse. The system can also include that the transmitter and the first and second receivers are mounted along an axis in the direction of travel of the survey vessel and the transmitter is disposed between the first and second receivers and spaced from each of them by a predetermined separation.

18 Claims, 5 Drawing Sheets

(56) References Cited

OTHER PUBLICATIONS

Hardy, Rob; "Seismic Acquisition", Basic Seismic processing for interpreters; Released Jan. 29, 1999; pp. 1-13.
Singapore Search Report; Singapore Application No. 10201510241U; dated Apr. 10, 2018.

* cited by examiner

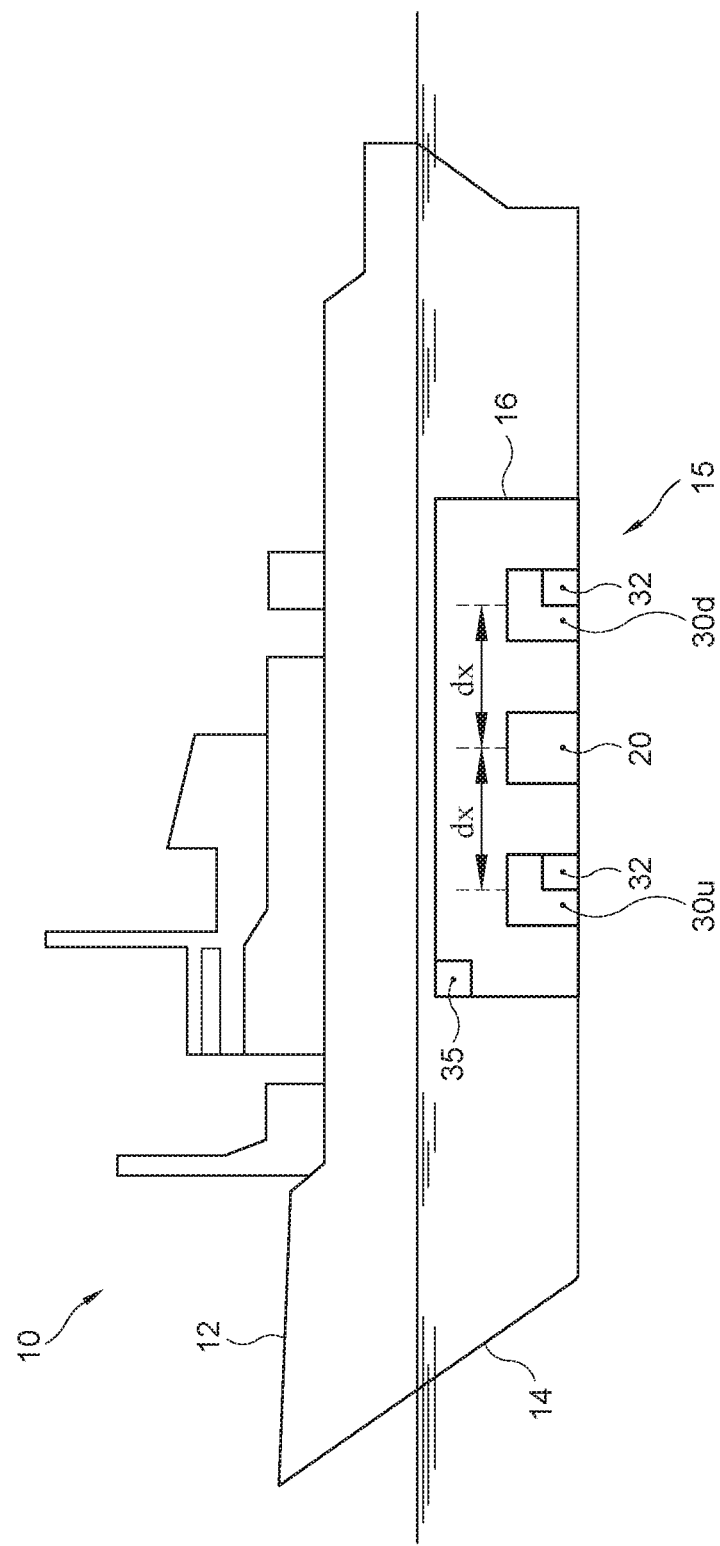

MARINE SURVEYING

CROSS REFERENCE TO RELATED APPLICATIONS

This application claims priority from Dutch Patent Application No. 2013969, filed Dec. 12, 2014, the contents of which are entirely incorporated by reference herein.

FIELD OF TECHNOLOGY

The present invention relates generally to the field of marine surveying. More particularly, the present invention relates to surveying the structure beneath the seabed using a sub-bottom profiler.

BACKGROUND

A known system for surveying the structure beneath the seabed using a sub-bottom profiler 15 is shown in FIGS. 1(a), (b). In this system, a transmitter 20 and a receiver 30 are hull mounted to a survey vessel with the transmitter 20 being upstream with respect to the direction of travel of the survey vessel. The transmitter 20 transmits pulses that travel towards the seabed. Since sound energy is reflected off the boundaries between layers of different densities (and hence acoustic impedance), as a transmitted pulse encounters the boundary between the water and the surface of the seabed, some of its energy is reflected and some of its energy penetrates further into the seabed. As its energy penetrates further into the seabed, further reflections occur as boundaries between layers of, for example, clay, sand and other sediments are encountered. The receiver 30 receives the reflections that allow an image of the structure beneath the seabed to be built up. FIGS. 2 (a), (b) illustrate the continued operation of the known system. It may be seen that the distance on the seabed between the reflection point of successive pulses, dx, i.e. the density of the data collected, is governed by the pulse repetition rate and the speed of the survey vessel. For a pulse repetition rate of 450 ms and a survey vessel moving at 4 knots (2 m/s), the resulting dx is 0.9 m.

The present invention stems from the inventors' realization that surveying capability is fundamentally constrained by the key physical parameters of the survey, namely the deepest water depth and the penetration beneath the seabed, which place a limit on the maximum pulse repetition rate.

SUMMARY OF INVENTION

With this in mind, according to a first aspect, the present invention may provide a system for surveying the structure beneath the seabed using a sub-bottom profiler, comprising:
 a survey vessel; and
 a sub-bottom profiler mounted to travel with the survey vessel, the sub-bottom profiler comprising a transmitter for transmitting pulses at a predetermined period between pulses towards the seabed, and a first receiver and a second receiver for receiving reflections from the seabed of each transmitted pulse;
 wherein the transmitter and the first and second receivers are mounted along an axis in the direction of travel of the survey vessel and the transmitter is disposed between the first and second receivers and spaced from each of them by a predetermined separation.

The present invention, by providing a further receiver upstream of the transmitter, is able to provide enhanced surveying capability without requiring a higher pulse repetition rate (i.e. without requiring a shorter period between pulses). The enhanced surveying capability can be used to survey at high speed or to provide better quality reflection data while surveying at low speed.

Preferably, when the system is in use, the speed of the survey vessel is selected in a high speed mode such that the distance travelled by the transmitter between pulses equals twice the predetermined separation.

Preferably, when the system is in use, the speed of the survey vessel is selected in a low speed mode such that the distance travelled by the transmitter between pulses equals the predetermined separation.

Preferably, the system is switchable between the high speed mode and the low speed mode.

The system may further comprise third and fourth receivers that are mounted along said axis, wherein the transmitter is disposed between the third and fourth receivers and spaced from each of them by a second predetermined separation. Through the ability to select between the use of the first and second receivers, on the one hand, and the use of the third and fourth receivers, on the other hand, the user is provided with more options as to survey speed.

The sub-bottom profiler may be mounted to the hull of the survey vessel or to a body towed by the survey vessel.

According to a second aspect, the present invention may provide a sub-bottom profiler intended to be mounted for travel with a survey vessel, comprising:
 a transmitter for transmitting pulses at a predetermined period between pulses towards the seabed, and a first receiver and a second receiver for receiving reflections from the seabed of each transmitted pulse;
 wherein the transmitter and the first and second receivers are mounted in fixed relation to one another along an axis with the transmitter being disposed between the first and second receivers and spaced from each of them by a predetermined separation.

In the context of the present invention, the term "seabed" is to be construed broadly so as to cover the floor of other expanses of water, such as that of an ocean or a lake, regardless of whether the other expanses of water are technically seas or not.

BRIEF DESCRIPTION OF THE DRAWINGS

Exemplary embodiments of the invention are hereinafter described with reference to the accompanying drawings, in which:
FIG. 3 shows a view of a system in accordance with the present invention.

DETAILED DESCRIPTION

Figure 1A:
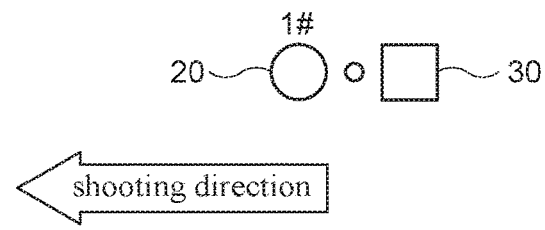
FIGS. 1(a), (b) show highly schematic views of the operation of a known sub-bottom profiling system in plan and side view, respectively.
Figure 1B:
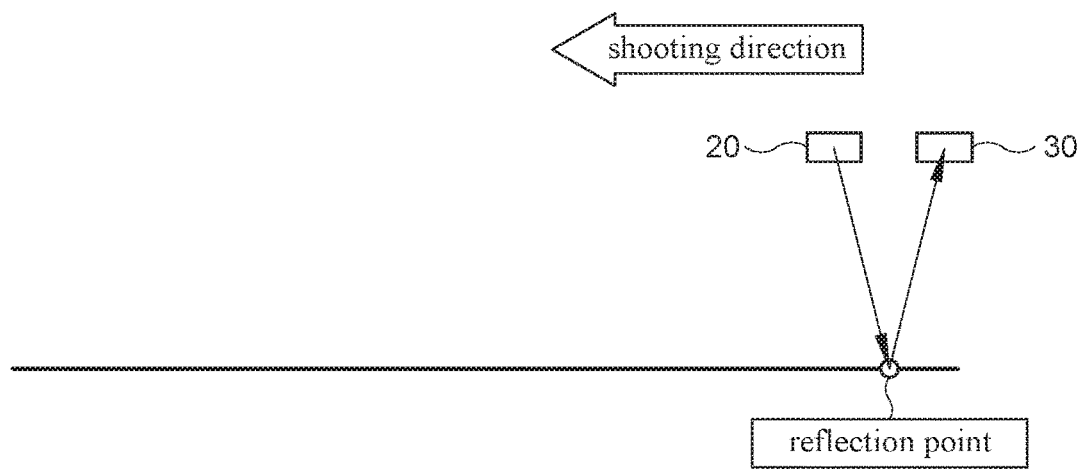
Figure 2A:
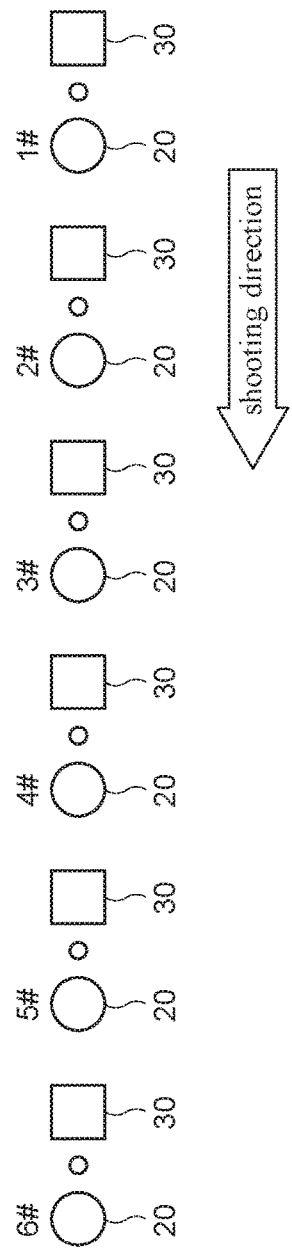
FIGS. 2(a), (b) illustrate the continued operation of the known system in plan and side view, respectively.
Figure 2B:
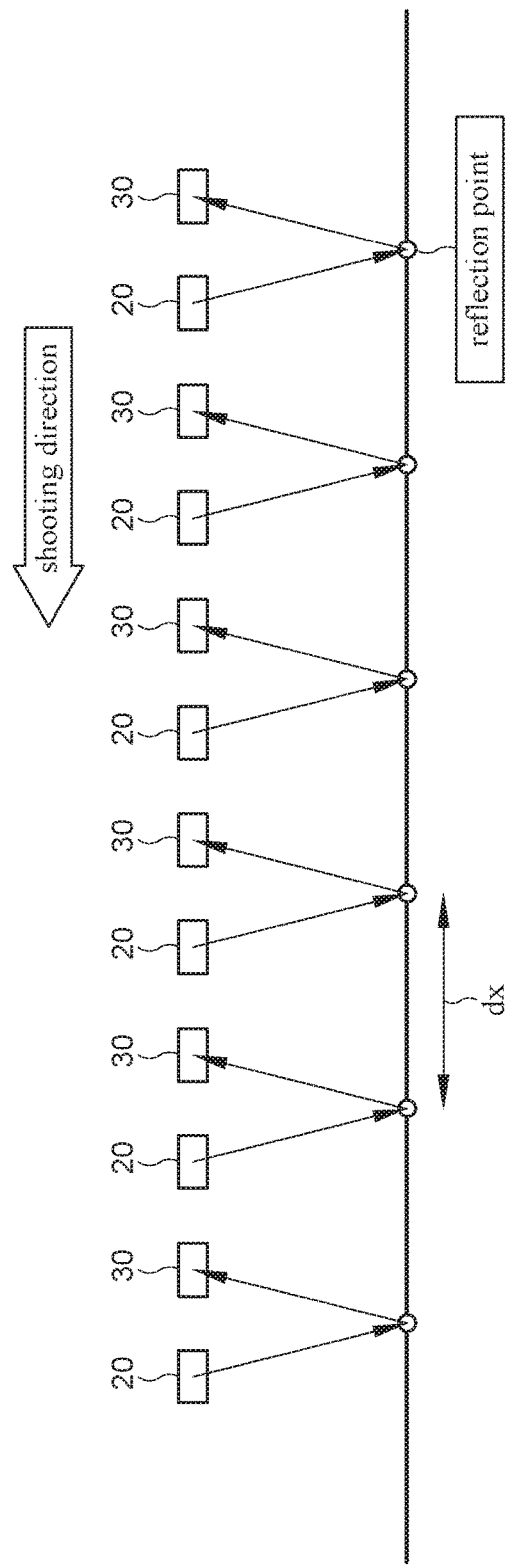

A system 10 for surveying the structure beneath the seabed in accordance with an embodiment of the invention is shown in FIG. 3. The system 10 comprises a survey vessel 12 having a hull 14 to which is mounted a sub-bottom profiler 15. The sub-bottom profiler 15 comprises a frame 16 by which the sub-bottom profiler 15 is mounted to the hull 14. The sub-bottom profiler 15 further comprises a transmitter 20 and first and second receivers 30$u,d$. The transmitter 20 and the receivers 30$u,d$ are positioned on the frame 16 such that they sit on a single axis of the frame 16 with the transmitter 20 being disposed between the receivers 30$u,d$ and spaced from each of them by a predetermined separation, dx. The frame 16 is mounted to the hull 14 of the survey vessel 12 such that the above-mentioned axis is in alignment with the direction of travel of the survey vessel 12.

Figure 4A:
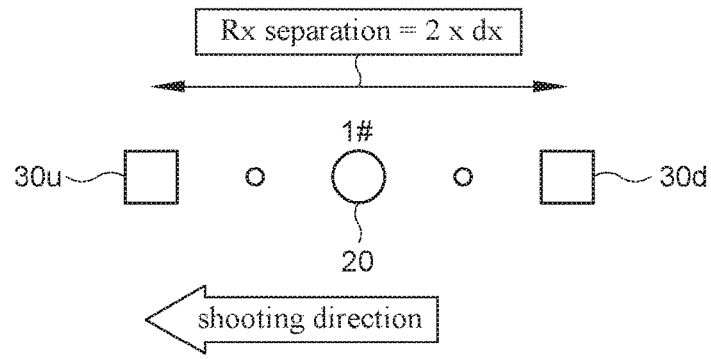
FIGS. 4(a), (b) show a highly schematic view of the operation of FIG. 3 system in plan and side view, respectively.
Figure 4B:
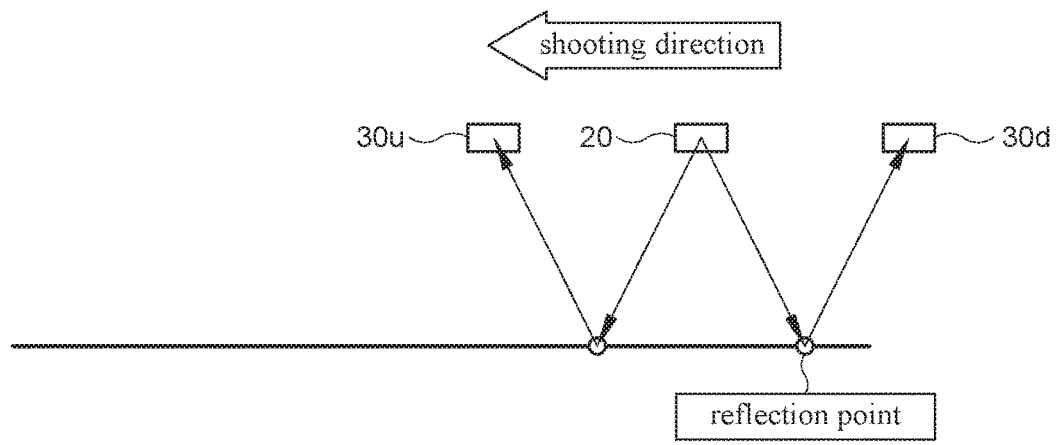

Referring to FIGS. 4($a$),($b$), the transmitter 20 is operable to transmit pulses at a predetermined repetition rate, i.e. at a predetermined period between pulses, towards the seabed. In one embodiment, the transmitter 20 transmits a frequency modulated chirp pulse. The sweep of the pulse is preferably wideband, for example, 1 kHz to 10 kHz.

As is visible in FIG. 4($b$), for each pulse transmitted by the transmitter 20, the upstream receiver 30$u$ receives a reflection of the pulse via an upstream reflection point, called a common mid point, CMP, on the seabed and the downstream receiver 30$d$ receives a reflection of the pulse via a downstream CMP. Each receiver 30$u,d$ comprises a plurality of sensors, which sensors may be hydrophones, and a local controller 32. Each local controller 32 is operable, treating each sensor as part of a sensor array, to perform a sensor array conditioning operation on the raw reflection data. The sensor array conditioning operation typically comprises summing the data recorded at each sensor within the respective receiver 30$u,d$. The location of the summed output is assumed to be at the center of the respective receiver 30$u,d$. Each local controller 32 outputs a data stream of conditioned reflection data for that receiver 30$u,d$.

The system 10 further comprises a controller 35 which controls the operation of the transmitter 20 and receives the conditioned reflection data from the receivers 30$u,d$. The controller 35 can form part of the sub-bottom profiler 15 in which case it may be located on the hull 14 as shown, or alternatively, not form part of the sub-bottom profiler 15 itself and be located elsewhere on the survey vessel 15. Based on the received reflection data, the system 10 generates imaging data of the structure beneath the seabed.

Figure 5A:
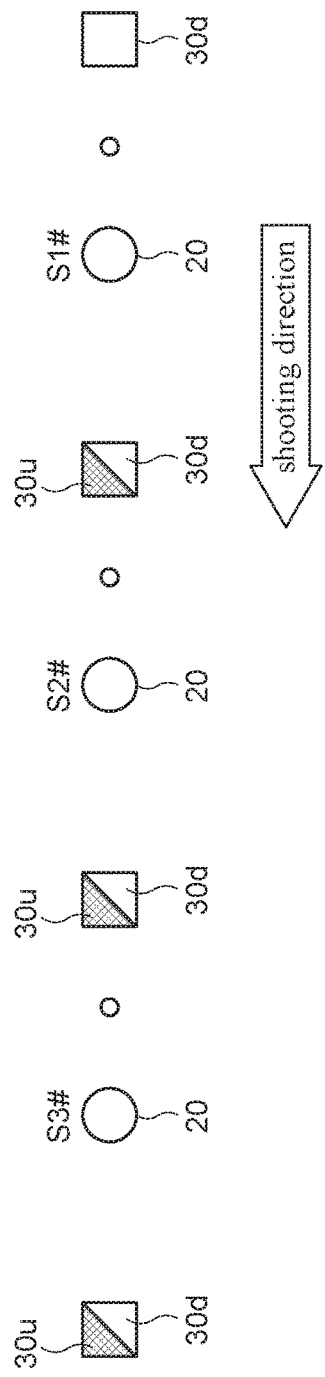
FIGS. 5(a), (b) illustrate the continued operation of the FIG. 3 system in plan and side view, respectively.
Figure 5B:
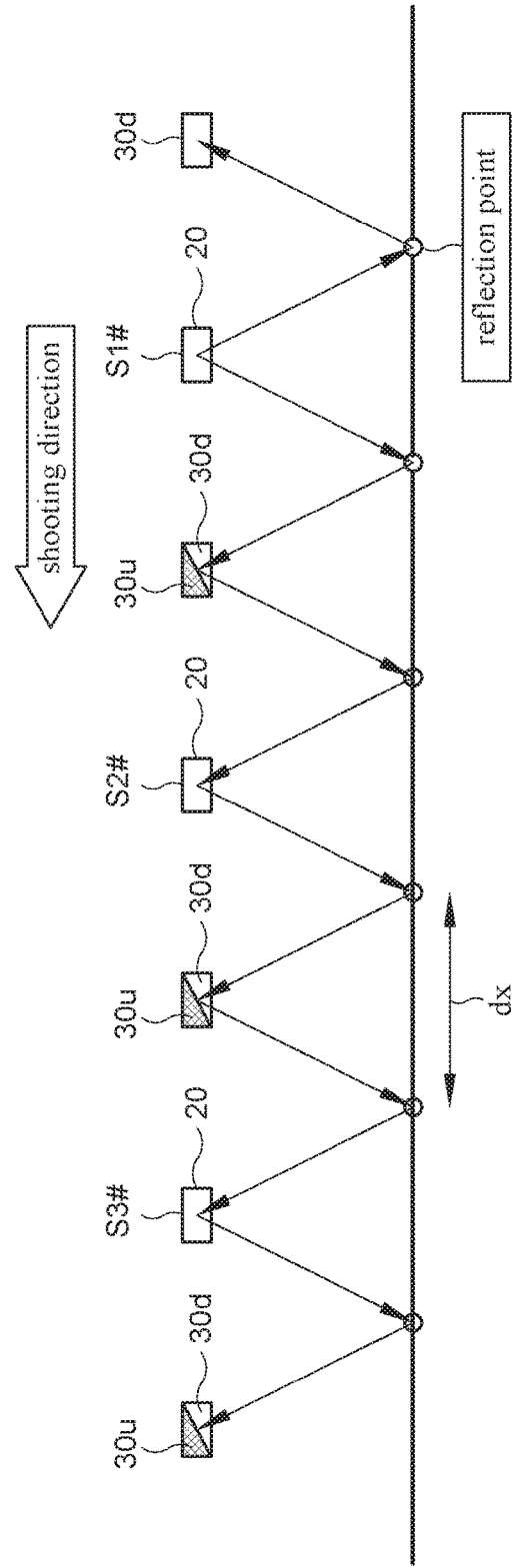

In FIGS. 5($a$), ($b$), the system is shown in use with the speed of the survey vessel being set to a high speed mode in which it travels at, for example, 8 knots (4 m/s). S1#, S2#, S3# denote the positions of the transmitter 20 after each of the first 3 transmitted pulses. With reference to FIG. 5($b$), it will be appreciated that the preferred embodiment of the present invention is able to achieve the same resolution of survey as the above-mentioned known system while travelling at twice the speed.

The system 10 can also be operated in a standard, low speed mode in which it travels at, for example, 4 knots (2 m/s). In this mode, each CMP is measured first by the upstream receiver 30$u$ and later by the downstream receiver 30$d$. Such duplication in the reflection data can be useful in improving the signal-to-noise ratio of the reflection data, and thereby improve the quality of the survey.

The system 10 can also be provided with one or more further upstream/downstream pairs of receivers. In one embodiment, the system 10 further comprises third and fourth receivers that are also mounted along the above-mentioned axis but are each spaced from the transmitter by a second (larger) predetermined separation. A system 10 equipped with one or more further upstream/downstream pairs of receivers provides the user with more flexibility as to the survey speed, since for a given pair of upstream/downstream receivers that are selected (i.e. made active) for a survey their separations from the transmitter determine the speed of the survey vessel in the low speed mode and the high speed mode.

What is claimed:

1. A system for surveying the structure beneath a seabed using a sub-bottom profiler, comprising:
    a survey vessel; and
    a sub-bottom profiler mounted to travel with the survey vessel, the sub-bottom profiler comprising a transmitter for transmitting pulses at a predetermined period between pulses towards the seabed, and a first receiver and a second receiver for receiving reflections from the seabed of each transmitted pulse;
    wherein the transmitter and the first and second receivers are mounted along an axis in the direction of travel of the survey vessel and the transmitter is disposed between the first and second receivers and spaced from each of them by a predetermined separation, and the system switchable between a high speed mode and a low speed mode.

2. The system according to claim 1, wherein a speed of the survey vessel, in the high speed mode, is selected such that a distance travelled by the transmitter between pulses equals twice the predetermined separation.

3. The system according to claim 1, wherein a speed of the survey vessel, in the low speed mode, is selected such that a distance travelled by the transmitter between pulses equals the predetermined separation.

4. The system according to claim 1, wherein the transmitter is operable to transmit a frequency modulated chirp pulse.

5. The system according to claim 1, wherein each receiver comprises an array of sensors.

6. The system according to claim 1, further comprising third and fourth receivers that are mounted along the axis, wherein the transmitter is disposed between the third and fourth receivers and spaced from each of them by a second predetermined separation.

7. The system according to claim 1, wherein the sub-bottom profiler is mounted to a hull of the survey vessel.

8. The system according to claim 1, further comprising a body towed by the survey vessel, wherein the sub-bottom profiler is mounted to the towed body.

9. The system according to claim 1, further comprising a frame to which the transmitter and the first and second receivers are mounted in fixed relation to one another.

10. A sub-bottom profiler intended to be mounted for travel with a survey vessel, comprising:
    the survey vessel speed selectable between a high speed mode and a low speed mode; and
    a transmitter for transmitting pulses at a predetermined period between pulses towards a seabed, and a first receiver and a second receiver for receiving reflections from the seabed of each transmitted pulse;
    wherein the transmitter and the first and second receivers are mounted in fixed relation to one another along an axis with the transmitter being disposed between the first and second receivers and spaced from each of them by a predetermined separation.

11. The sub-bottom profiler according to claim 10, further comprising a frame to which the transmitter and the first and second receivers are mounted in fixed relation to one another.

12. The sub-bottom profiler according to claim 10, wherein a speed of the survey vessel, in the high speed mode, is selected such that a distance travelled by the transmitter between pulses equals twice the predetermined separation.

13. The sub-bottom profiler according to claim 10, wherein a speed of the survey vessel, in the low speed mode, is selected such that a distance travelled by the transmitter between pulses equals the predetermined separation.

14. The sub-bottom profiler according to claim 10, wherein the transmitter is operable to transmit a frequency modulated chirp pulse.

15. The sub-bottom profiler according to claim 10, wherein each receiver comprises an array of sensors.

16. The sub-bottom profiler according to claim 10, further comprising third and fourth receivers that are mounted along the axis, wherein the transmitter is disposed between the third and fourth receivers and spaced from each of them by a second predetermined separation.

17. The sub-bottom profiler according to claim 10, wherein the sub-bottom profiler is mounted to a hull of the survey vessel.

18. The sub-bottom profiler according to claim 10, further comprising a body towed by the survey vessel, wherein the sub-bottom profiler is mounted to the towed body.

\* \* \* \* \*